United States Patent
Cudicio et al.

[11] Patent Number: 6,059,070
[45] Date of Patent: May 9, 2000

[54] SOUNDPROOFED CONDUIT TO DISCHARGE FUMES

[75] Inventors: Marco Peter Cudicio, Torreano; Giorgio Beuzer, Cividale, both of Italy

[73] Assignee: Danieli & Officine Meccaniche SpA, Buttrio, Italy

[21] Appl. No.: 09/019,744

[22] Filed: Feb. 6, 1998

[30] Foreign Application Priority Data

Feb. 7, 1997  [IT]  Italy ................................ UD97A0025

[51] Int. Cl.[7] .................................................. E04F 17/04
[52] U.S. Cl. ......................... 181/224; 181/225; 454/906
[58] Field of Search .................................... 181/224, 225, 181/229, 217, 218; 454/346, 906

[56] References Cited

U.S. PATENT DOCUMENTS

| | | |
|---|---|---|
| 2,268,918 | 1/1942 | Allan . |
| 4,395,023 | 7/1983 | Tomizawa et al. . |
| 4,573,551 | 3/1986 | Schwerdtner et al. .................. 181/218 |
| 4,872,398 | 10/1989 | Ramsay .................................... 454/906 |
| 5,522,768 | 6/1996 | Brodt et al. ............................. 454/906 |
| 5,559,310 | 9/1996 | Hoover et al. . |
| 5,728,980 | 3/1998 | Zarnick ................................... 181/224 |

FOREIGN PATENT DOCUMENTS

| | | |
|---|---|---|
| 3245374 | 3/1984 | Germany . |
| 4345052 | 7/1995 | Germany . |
| 1154335 | 6/1969 | United Kingdom . |
| 1348075 | 3/1974 | United Kingdom . |
| 8604954 | 8/1986 | WIPO . |

*Primary Examiner*—Khanh Dang
*Attorney, Agent, or Firm*—Antonelli, Terry, Stout & Kraus, LLP

[57] ABSTRACT

Soundproofed conduit to discharge fumes, advantageously associated with assemblies to discharge fumes for melting systems in steel production plants, the conduit being located between the ventilation system (14) and an outlet chimney (13), at least the first segment (19a) of the discharge conduit defining a section with a value (A) through which the fumes transit, the conduit (12) defining a path, from the relative ventilation system (14) to the discharge chimney (13), comprising at least two counter-opposed and controlled changes in direction (15a, 15b) defining at least respective consecutive segments (19a, 19b, 19c) arranged one at an angle to another, the changes in direction being functionally configured so as to cause phase and counter-phase effects of the sound waves generated by the fluid in transit, the phase and counter-phase effects having the purpose of at least deadening partly the sound waves caused by the passage of the fluid.

60 Claims, 2 Drawing Sheets

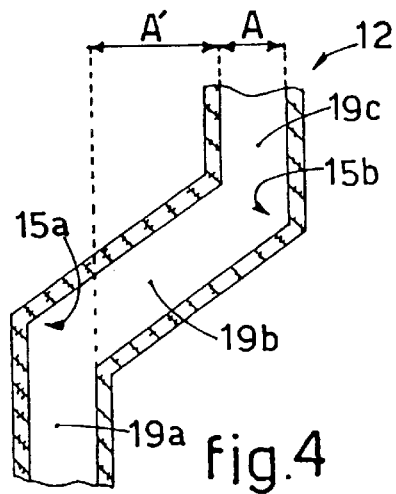
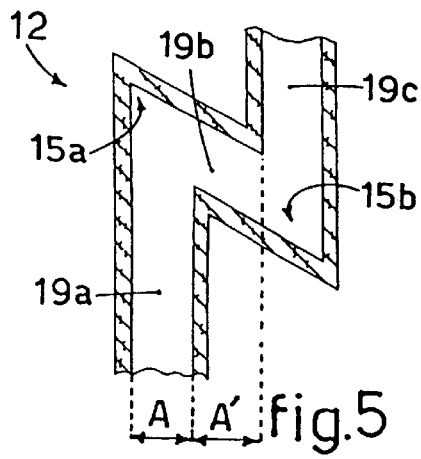
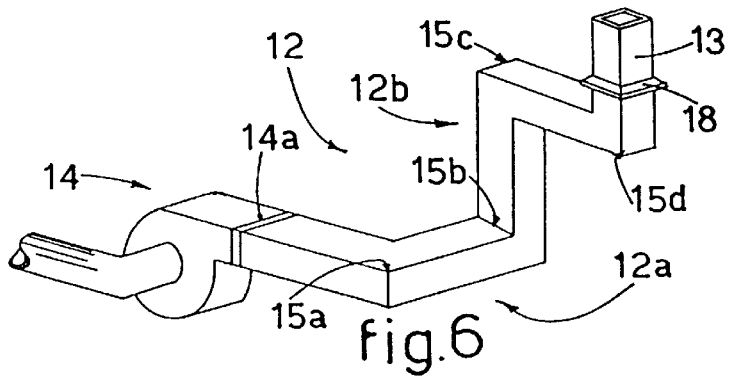
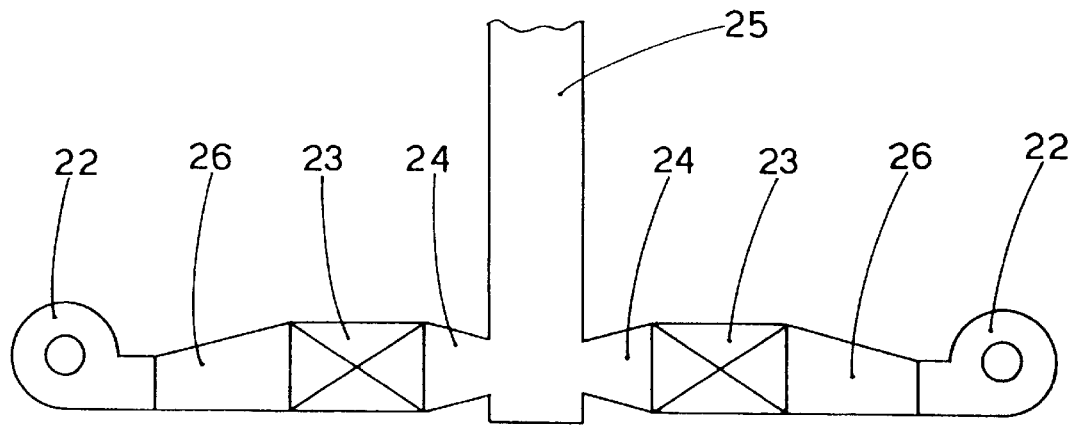
fig.7 (PRIOR ART)

SOUNDPROOFED CONDUIT TO DISCHARGE FUMES

BACKGROUND OF THE INVENTION

This invention concerns a soundproofed conduit to discharge fumes.

The invention is applied in particular, but not exclusively, in the field of steel production in order to soundproof the delivery side of the fans connected to the outlet chimneys, associated with the melting systems, such as electric furnaces and similar, through which the fumes are discharged to the environment.

The state of the art covers conduits to discharge fumes, usually made of brickwork and metallic structural work, through which the fumes generated by the melting systems, such as for example electric furnaces, after being passed through the opportune filter systems, are discharged into the environment.

The fumes are directed to the discharge conduits by means of the appropriate ventilation and conveying systems, which cooperate with conduits to deliver the fumes to the chimney.

It is well-known that a great deal of noise is caused as the fumes are conveyed by these ventilation systems; to obviate this problem, soundproofing systems are normally included and associated with the discharge conduits.

In the field of steel production, the inner part of the discharge conduits are normally at least partly lined with sound absorbent panels made with a plurality of adjacent baffles made of mineral wool or a similar material.

The traditional structure of such discharge conduits such as are known to the state of the art is shown in FIG. 7. It includes ventilation systems 22 connected by means of structural connections 26 to soundproofing elements 23 structured in soundproofing packs or panels which are in turn connected, by means of connection means 24, to the chimney 25.

However, these sound absorbent panels or packs are subject to premature wear and have the disadvantage that, with time, they release into the environment fibres, dust or particles of various grain size, which causes a further and often considerable secondary pollution.

Moreover, as the layer releases particles into the environment, it becomes progressively thinner as a result, and therefore the capacity of the panel to absorb sound is reduced.

This situation requires frequent maintenance operations, both to maintain the soundproofing effect of the sound absorbent panels and also to prevent the spread of polluting substances into the environment.

The sound absorbent panels moreover are very expensive, difficult and troublesome to install and require both specialised personnel and long installation times.

This leads to considerable increases in running costs, long and frequent downtimes of the plant, difficulties in finding the specialised staff to install the panels, and still other disadvantages.

Such structural connections which are normally included in conduits known to the state of the art are, moreover, subject to premature wear and require continuous and constant maintenance.

In physics there is also the concept whereby the angular diversion of a transit conduit for fluids causes a reduction in the noise created by the passage of the said fluid.

This concept, connected with the reduction of noise, has been used so far, in the field of steel production, for air conditioning conduits (for example in U.S. Pat. No. 4,395,023, FIGS. 10 and 11) but never for discharge conduits of the chimney type made of brickwork. Moreover, solutions have been proposed which use elbow-shaped curved conduits in order to discharge the fluids, but with regard to problems of a completely different nature and with normal conduits with connected curved segments.

For example, GB-A-1.154.335 describes a system to control the fluctuations in pressure of gases emitted from a melting container so that the pressure can be controlled in the gas recovery system.

In order to control this pressure, GB'335 includes a plurality of breather pipes arranged on a chimney located above the melting container so that the pressure is controlled without being influenced by pulsations which derive from abrupt variations in the reactions inside the container.

The conduit to discharge the fumes is shaped with connected curved segments, but this is quite random and justified by structural, not functional reasons.

GB-A-1.348.075 includes a system of movable pipes to discharge the fumes produced by an oscillating melting container; the pipes are coupled to each other with flanges which rotate with respect to each other so that the whole system of pipes can follow and adapt to the movements of the container for melting the metal.

In this case too, the arrangement of the pipes in connected curved segments is purely random and does not concern the chimney.

U.S. Pat. No. 2,268,918 also provides substantially a flexible connection between the chimney and the discharge system so as to follow the oscillatory movements of the melting container during the pouring of the liquid metal.

These three prior art documents are not concerned with the problems connected to the reduction of noise in discharge conduits of the chimney type made of brickwork.

SUMMARY OF THE INVENTION

To overcome these shortcomings of the state of the art, which businessmen in the field have long complained of, and to achieve further advantages, the present applicants have designed, tested and embodied this invention.

The purpose of the invention is to obtain a soundproofed conduit to discharge fumes able to supply a simple, inexpensive and long-lasting solution which will give a high productivity, constant in time.

The invention also makes it possible to eliminate those operations of ordinary maintenance which are necessary to maintain the efficiency of the soundproofing capacity and consequently reduces the downtimes and the running costs of the plant to a considerable extent.

Furthermore, the invention completely eliminates the problem of secondary environmental pollution caused by the discharge into the environment of particles, dust or otherwise.

A further advantage is that the soundproofed conduit according to the invention can be equipped in a very short time and even by non-specialised staff.

Moreover, the soundproofed conduit according to the invention is made substantially totally of brickwork and makes it possible to obtain substantial savings in terms of energy, in the structural works connecting it to the machine which produces the flow of fluid to be soundproofed, in the civil works, etc.

The conduit to discharge fumes according to the invention consists of blocks or plates made of bricks, concrete, refractory material, metallic structural work or other similar or comparable material, which define a path from the ventilation system to the outlet chimney comprising at least two consecutive angled changes of direction.

The at least two changes of direction in the path to discharge the fumes, advantageously at a sharp angle, cause respective rebounds of the sound waves which accentuate the intrinsic soundproofing effect of the inner surfaces of the discharge conduit.

To be more exact, the controlled changes in direction made along the path to discharge the fumes generate a phase and counter-phase effect of the sound waves; the level of noise is thus considerably damped and reduced, and also the sound waves are intercepted and prevented from spreading.

This deadening of the noise is particularly relevant in correspondence or in proximity with particular frequencies, according to the angles and the geometric sizes of the changes in direction along the discharge path.

The chimney, or part thereof, to discharge the fumes into the environment is normally supported in an axial manner, and then attached to, this conduit.

According to a first embodiment, the path of the fumes along the discharge conduit comprises two consecutive and substantially counter-opposed changes in direction.

According to a variant, there are three or more consecutive changes in direction.

In one embodiment of the invention, the changes in direction along the path to discharge the fumes are all configured substantially at a right angle.

According to other embodiments, the changes in direction are all configured at acute angles, with a preferential minimum value of around 60÷65°, or all at obtuse angles, with a preferential maximum value of around 115÷120°.

According to a further variant, the consecutive changes in direction along the path to discharge the fumes define angles which are alternatively right, acute and/or obtuse.

In one embodiment of the invention, the path from the ventilation system to the chimney develops entirely with a substantially vertical trend, or in any case directed upwards.

According to a variant, the discharge path has a substantially horizontal development.

According to a further embodiment, the discharge path has a mixed development, and comprises at least a segment with a substantially horizonal development and at least a segment with a substantially vertical development.

The conduit to discharge the fumes according to the invention, in each one of its segments, may have a desired section, for example rectangular, square, polygonal, or even circular or semi-circular.

Moreover, the section of the conduit may be closed or open on the side facing the intake chamber, if there is one.

According to one variant of the invention, at least the first segment of the discharge conduit has at least one of its inner faces lined with sound absorbent means.

According to a further variant, all the faces at least of the first segment of the discharge conduit are lined with sound absorbent means.

According to further variants, at least one inner face of all the segments of the discharge conduit is lined with sound absorbent means.

BRIEF DESCRIPTION OF THE DRAWINGS

The attached figures are given as a non-restrictive example, and show some preferred embodiments of the invention as follows:

FIG. 4 shows a part view of another variant of FIG. 2;

FIG. 5 shows a part view of another variant of FIG. 2;

FIG. 6 shows another embodiment of the invention;

FIG. 7 shows an embodiment of the state of the art.

DETAILED DESCRIPTION OF THE PREFERRED EMBODIMENTS

Figure 1:
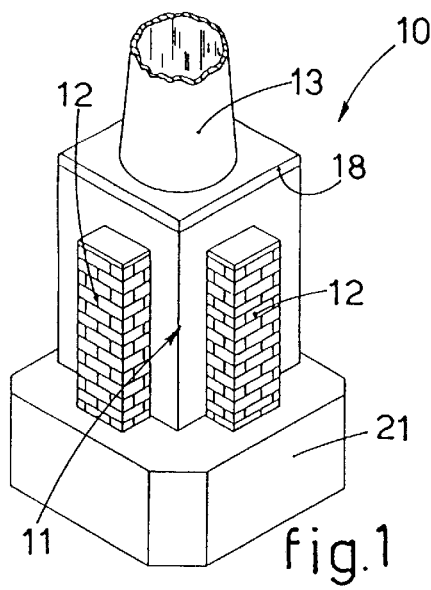
FIG. 1 shows in diagram form, with a view from outside, a soundproof conduit to discharge fumes according to the invention.

FIG. 1 shows, in diagram form and from the outside, a system to discharge fumes 10 which can be associated with a steel producing plant to discharge into the environment the fumes produced by melting systems, such as for example an electric furnace.

The invention may also be applied however to different fields, for example in the production of paper or otherwise.

Figure 2:
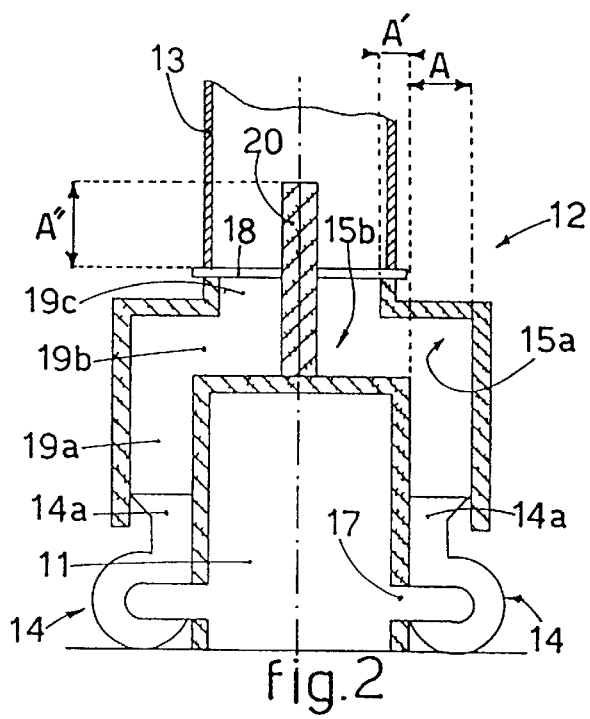
FIG. 2 shows in diagram form a lengthwise section of the discharge conduit of FIG. 1.

The system to discharge fumes 10, in the case of FIGS. 1 and 2, has an intake chamber 11 connected by means of the apertures 17 and without any metallic connecting structures, to relative ventilation systems 14, each of which is associated with a discharge conduit 12 which conveys the fumes towards a chimney 13.

The intake chamber 11, in the case of FIG. 1, cooperates at the lower part with a further soundproofing chamber 21.

The chimney 13 rests on the discharge conduit 12 by means of an assembly base 18.

In this case, the inlet end of the discharge conduits 12 is connected to the delivery side 14$a$ of the ventilation systems 14.

The discharge conduits 12 define a path for the discharge of the fumes, from the ventilation system 14 to the chimney 13, which comprises, in the case of FIG. 2, two consecutive changes in direction, 15$a$ and 15$b$, at a sharp right angle.

The changes in direction 15$a$ and 15$b$ define a first vertical segment 19$a$, a second intermediate segment 19$b$, in this case horizontal, and a third vertical segment 19$c$ of the discharge conduit 12.

In this case, the third vertical segment 19$c$ of each discharge conduit 12 extends centrally with a dividing baffle 20, able to make parallel the flow of fumes arriving from the various conduits 12 so as to reduce the turbulence of the fumes at the outlet.

If the transit section of the discharge conduit 12 is defined as A, the distance A' between the first vertical segment 19$a$ and the third vertical segment 19$c$ is defined by the relation 0.3A<A'<2A.

According to this relation it can be seen that the first vertical segment 19$a$ can also be found, for values greater than A', in a distant position from the wall of the intake chamber 11 or in any case from the position of the chimney 13.

On the contrary, if the height at which the central dividing baffle 20 extends inside the chimney 13 is defined as A", the relation is the following: 0<A"<2A.

The angled changes in direction 15$a$, 15$b$ defined along the discharge conduit 12 cause consecutive rebounds of the sound waves, deriving from the passage of the fumes, which accentuate the damping of the noise level which derives from the intrinsic capacity to absorb sound of the material which comprises the discharge conduits 12.

In this case, the discharge conduits 12 are made of ordinary bricks of the type which can be found on the market.

According to other embodiments, special bricks can be used, which have an intrinsic high soundproofing capacity.

Moreover, it is possible to use blocks made of concrete, plates, panels, metallic structural elements, refractory material or other similar or comparable material.

Figure 3:
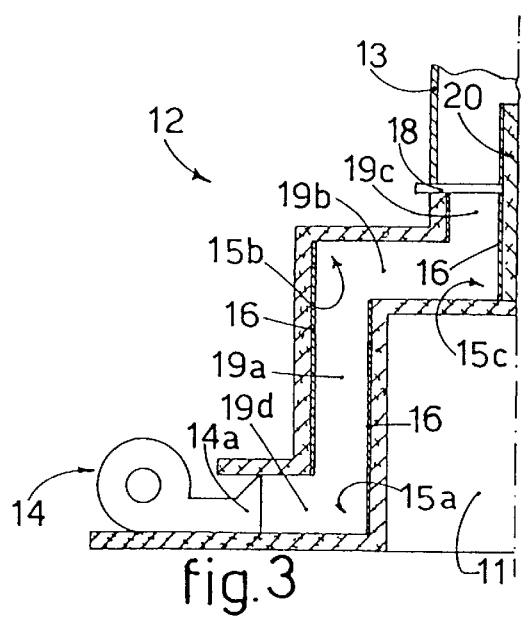
FIG. 3 shows a part view of a variant of FIG. 2.

According to the embodiment shown in FIG. 3, the discharge conduit 12 has three consecutive changes in direction, 15a, 15b, and 15c, all at a sharp right angle with a first horizontal segment 19d which precedes the other segments 19a, 19b and 19c.

This embodiment further accentuates the soundproofing capacity of the discharge conduit 12 due to the greater number of rebounds in the sound waves on their journey from the ventilation system 14 to the chimney 13 which is located downstream of the discharge conduit 12.

The embodiment shown in FIG. 4 provides that the changes in direction 15a, 15b should both be at an obtuse angle, whereas the embodiment shown in FIG. 5 provides that the changes in direction should both be at an acute angle.

In these embodiments, the intermediate segment 19b, located between the first vertical segment 19a and the third vertical segment 19c, is inclined respectively upwards (FIG. 4) and downwards (FIG. 5).

In the different embodiments of the invention, the maximum value which the angle of the change in direction 15a, 15b can be is around 120°, while the minimum value is around 60°.

However, mixed embodiments are possible where there are alternate changes in direction with a right angle, or an acute or obtuse angle.

There may also be more than three consecutive changes in direction.

In the embodiment shown in FIG. 3, the inner face of the first vertical segment 19a is lined with plate-type sound absorbent means 16, for example made of refractory material, special tiles or other similar material.

The plate-type sound absorbent means 16 may be applied on the whole inner surface of the first vertical segment 19a, or at least on the face opposite the intake chamber 11.

According to a variant, only the third vertical segment 19c of the discharge conduit 12, or also the third vertical segment 19c, has plate-type sound absorbent means 16 lining the inner walls.

According to a further variant, the entire discharge conduit 12 is lined with plate-type sound absorbent means 16.

In another embodiment, the inner face of the plate-type sound absorbent means 16 are corrugated and/or grooved, in order to further increase the soundproofing capacity thereof.

The embodiments shown in FIGS. 1–5 show discharge conduits 12 with a substantially vertical development along their whole extent.

The variant shown in FIG. 6 shows a discharge conduit 12 with a first segment 12a, comprising two consecutive changes in direction 15a, 15b with a substantially horizontal development, and a second segment 12b, connected on one side to the first segment 12a and on the other side to the chimney 13, with a substantially vertical development.

The second segment 12b in turn has two consecutive changes in direction 15c and 15d.

According to a further variant, for particular and specific applications, along at least one segment of the discharge conduit 12 there are sound absorbent baffles, made for example of mineral wool or similar material; their function is to further increase the soundproofing capacity of the discharge conduit 12.

We claim:

1. A soundproofed device to discharge fumes from a melting system in a steel plant, comprising:

a forced ventilation system to force the fumes from the melting system through the soundproofed device;

a substantially vertical chimney;

a discharge conduit interposed between the forced ventilation system and the chimney, the discharge conduit being made of a refractory material and having at least a first segment having an inlet operably connected to the forced ventilation system, a second substantially vertical segment arranged at a base of the chimney and having an outlet connected to the chimney, and a third segment connecting an outlet of the first segment to an inlet of the second segment, the third segment being inclined with respect to each of the first and second segments, whereby the fumes undergo changes of direction through the conduit to generate a phase and counter-phase effect of sound waves to reduce noise.

2. A soundproofed device according to claim 1, wherein the first segment is disposed substantially vertically, and has a longitudinal axis parallel to and offset from a longitudinal axis of the second segment.

3. A soundproofed device according to claim 2, wherein a distance A' between the first and second segments in a direction perpendicular to and passing through the longitudinal axes of the first and second segments satisfies the relation $0.3<A'<2A$, where A is a cross sectional width of the first segment measured in the direction perpendicular to and passing through the longitudinal axes of the first and second segments.

4. A soundproofed device according to claim 2, wherein the third segment has a substantially horizontal longitudinal axis forming a substantially right angle with a longitudinal axis of each of the first and second segments.

5. A soundproofed device according to claim 2, wherein a longitudinal axis of the third segment forms an acute angle with at least one of the longitudinal axes of the first and second segments.

6. A soundproofed device according to claim 2, wherein a longitudinal axis of the third segment forms an acute angle of around 60° with at least one of the longitudinal axes of the first and second segments.

7. A soundproofed device according to claim 2, wherein a longitudinal axis of the third segment forms an acute angle of at least 60° with at least one of the longitudinal axes of the first and second segments.

8. A soundproofed device according to claim 1, wherein a longitudinal axis of the third segment forms an acute angle with at least one of the longitudinal axes of the first and second segments.

9. A soundproofed device according to claim 1, wherein a longitudinal axis of the third segment forms an acute angle of around 60° with at least one of the longitudinal axes of the first and second segments.

10. A soundproofed device according to claim 1, wherein a longitudinal axis of the third segment forms an acute angle of at least 60° with at least one of the longitudinal axes of the first and second segments.

11. A soundproofed device according to claim 2, wherein a longitudinal axis of the third segment forms an obtuse angle with at least one of the longitudinal axes of the first and second segments.

12. A soundproofed device according to claim 2, wherein a longitudinal axis of the third segment forms an acute angle of around 120° with at least one of the longitudinal axes of the first and second segments.

13. A soundproofed device according to claim 2, wherein a longitudinal axis of the third segment forms an acute angle of up to 120° with at least one of the longitudinal axes of the first and second segments.

14. A soundproofed device according to claim 1, wherein a longitudinal axis of the third segment forms an obtuse angle with at least one of the longitudinal axes of the first and second segments.

15. A soundproofed device according to claim 1, wherein a longitudinal axis of the third segment forms an acute angle of around 120° with at least one of the longitudinal axes of the first and second segments.

16. A soundproofed device according to claim 1, wherein a longitudinal axis of the third segment forms an acute angle of up to 120° with at least one of the longitudinal axes of the first and second segments.

17. A soundproofed device according to claim 1, wherein the chimney is connected to a base which rests on a top of the second segment.

18. A soundproofed device according to claim 1, wherein a plurality of discharge conduits are provided between the forced ventilation system and the chimney.

19. A soundproofed device according to claim 18, wherein a central dividing baffle is provided extending upwardly within the chimney dividing the flows from the second segment of each of the plurality of discharge conduits.

20. A soundproofed device according to claim 19, wherein the central dividing baffle extends upwardly within the chimney a distance A" which satisfies the relation 0<A"<2A, where A is a cross sectional width of a first segment measured in the direction perpendicular to and passing through the longitudinal axes of the first segment and the chimney.

21. A soundproofed device according to claim 18, wherein a central intake chamber is provided between the melting system and the forced ventilation, and wherein the plurality of discharge conduits are arranged around an outside of the central intake chamber.

22. A soundproofed device according to claim 21, wherein the central intake chamber cooperates at a lower part thereof with a soundproofing chamber.

23. A soundproofed device according to claim 1, wherein an inner surface of the first segment is lined with a sound-absorbing material.

24. A soundproofed device according to claim 23, wherein an inner surface of the second segment is lined with a sound-absorbing material.

25. A soundproofed device according to claim 1, wherein an inner surface of the second segment is lined with a sound-absorbing material.

26. A soundproofed device according to claim 1, wherein an inner surface of the fume discharge conduit is lined with a sound-absorbing material.

27. A soundproofed device according to claim 26, wherein the entire inner surface of the fume discharge conduit is lined with a sound-absorbing material.

28. A soundproofed device according to claim 27, wherein the sound-absorbing material has a corrugated or grooved inner face.

29. A soundproofed device according to claim 26, wherein the sound-absorbing material has a corrugated or grooved inner face.

30. A soundproofed device according to claim 1, wherein at least one further segment is provided between the first segment and the forced ventilation system.

31. A combination of a melting system in a steel plant and a soundproofed device to discharge fumes from the melting system, comprising:
    a melting system of a steel plant;
    a forced ventilation system to force the fumes from the melting system through the soundproofed device;
    a substantially vertical chimney;
    a discharge conduit interposed between the forced ventilation system and the chimney, the discharge conduit being made of a refractory material and having at least a first segment having an inlet operably connected to the forced ventilation system, a second substantially vertical segment arranged at a base of the chimney and having an outlet connected to the chimney, and a third segment connecting an outlet of the first segment to an inlet of the second segment, the third segment being inclined with respect to each of the first and second segments, whereby the fumes undergo changes of direction through the conduit to generate a phase and counter-phase effect of sound waves to reduce noise.

32. A combination device according to claim 31, wherein the first segment is disposed substantially vertically, and has a longitudinal axis parallel to and offset from a longitudinal axis of the second segment.

33. A combination according to claim 32, wherein a distance A' between the first and second segments in a direction perpendicular to and passing through the longitudinal axes of the first and second segments satisfies the relation 0.3<A'<2A, where A is a cross sectional width of the first segment measured in the direction perpendicular to and passing through the longitudinal axes of the first and second segments.

34. A combination according to claim 32, wherein the third segment has a substantially horizontal longitudinal axis forming a substantially right angle with a longitudinal axis of each of the first and second segments.

35. A combination according to claim 32, wherein a longitudinal axis of the third segment forms an acute angle with at least one of the longitudinal axes of the first and second segments.

36. A combination according to claim 32, wherein a longitudinal axis of the third segment forms an acute angle of around 60° with at least one of the longitudinal axes of the first and second segments.

37. A combination according to claim 32, wherein a longitudinal axis of the third segment forms an acute angle of at least 60° with at least one of the longitudinal axes of the first and second segments.

38. A combination according to claim 31, wherein a longitudinal axis of the third segment forms an acute angle with at least one of the longitudinal axes of the first and second segments.

39. A combination according to claim 31, wherein a longitudinal axis of the third segment forms an acute angle of around 60° with at least one of the longitudinal axes of the first and second segments.

40. A combination according to claim 31, wherein a longitudinal axis of the third segment forms an acute angle of at least 60° with at least one of the longitudinal axes of the first and second segments.

41. A combination according to claim 32, wherein a longitudinal axis of the third segment forms an obtuse angle with at least one of the longitudinal axes of the first and second segments.

42. A combination according to claim 32, wherein a longitudinal axis of the third segment forms an acute angle of around 120° with at least one of the longitudinal axes of the first and second segments.

43. A combination according to claim 32, wherein a longitudinal axis of the third segment forms an acute angle of up to 120° with at least one of the longitudinal axes of the first and second segments.

44. A combination according to claim 31 wherein a longitudinal axis of the third segment forms an obtuse angle with at least one of the longitudinal axes of the first and second segments.

45. A combination according to claim 31, wherein a longitudinal axis of the third segment forms an acute angle of around 120° with at least one of the longitudinal axes of the first and second segments.

46. A combination according to claim 31, wherein a longitudinal axis of the third segment forms an acute angle of up to 120° with at least one of the longitudinal axes of the first and second segments.

47. A combination according to claim 31, wherein the chimney is connected to a base which rests on a top of the second segment.

48. A combination according to claim 31, wherein a plurality of discharge conduits are provided between the forced ventilation system and the chimney.

49. A combination according to claim 48, wherein a central dividing baffle is provided extending upwardly within the chimney dividing the flows from the second segment of each of the plurality of discharge conduits.

50. A combination according to claim 49, wherein the central dividing baffle extends upwardly within the chimney a distance A" which satisfies the relation 0<A"<2A, where A is a cross sectional width of a first segment measured in the direction perpendicular to and passing through the longitudinal axes of the first segment and the chimney.

51. A combination according to claim 48, wherein a central intake chamber is provided between the melting system and the forced ventilation, and wherein the plurality of discharge conduits are arranged around an outside of the central intake chamber.

52. A combination according to claim 51, wherein the central intake chamber cooperates at a lower part thereof with a soundproofing chamber.

53. A combination according to claim 31, wherein an inner surface of the first segment is lined with a sound-absorbing material.

54. A combination according to claim 53, wherein an inner surface of the second segment is lined with a sound-absorbing material.

55. A combination according to claim 31, wherein an inner surface of the second segment is lined with a sound-absorbing material.

56. A combination according to claim 31, wherein an inner surface of the fume discharge conduit is lined with a sound-absorbing material.

57. A combination according to claim 56, wherein the entire inner surface of the fume discharge conduit is lined with a sound-absorbing material.

58. A combination according to claim 57, wherein the sound-absorbing material has a corrugated or grooved inner face.

59. A combination according to claim 55, wherein the sound-absorbing material has a corrugated or grooved inner face.

60. A combination device according to claim 32, wherein at least one further segment is provided between the first segment and the forced ventilation system.

* * * * *